United States Patent
Chang

(10) Patent No.: US 10,814,728 B2
(45) Date of Patent: Oct. 27, 2020

(54) VEHICLE CHARGING ASSEMBLY BY USING WIND FORCE

(71) Applicant: Chun Chang, Tainan (TW)

(72) Inventor: Chun Chang, Tainan (TW)

( * ) Notice: Subject to any disclaimer, the term of this patent is extended or adjusted under 35 U.S.C. 154(b) by 346 days.

(21) Appl. No.: 15/911,426

(22) Filed: Mar. 5, 2018

(65) Prior Publication Data

US 2019/0270386 A1  Sep. 5, 2019

(51) Int. Cl.
*B60L 8/00* (2006.01)
*B60L 53/00* (2019.01)
*B60K 16/00* (2020.01)

(52) U.S. Cl.
CPC ............ *B60L 8/006* (2013.01); *B60L 53/00* (2019.02); *B60K 2016/006* (2013.01); *Y02E 10/72* (2013.01)

(58) Field of Classification Search
CPC .......... B60L 8/006; B60L 53/00; B60L 50/50; Y02E 10/721; B60K 2016/006; B60K 16/00
USPC .......................................................... 320/101
See application file for complete search history.

(56) References Cited

U.S. PATENT DOCUMENTS

| | | | | |
|---|---|---|---|---|
| 3,876,925 A * | 4/1975 | Stoeckert | ............... | B60K 16/00 322/1 |
| 6,327,994 B1 * | 12/2001 | Labrador | ................ | E02B 3/062 114/382 |
| 7,095,213 B2 * | 8/2006 | Weng | ..................... | H02J 7/0068 307/48 |
| 7,434,636 B2 * | 10/2008 | Sutherland | ............... | B60K 6/46 180/2.2 |
| 8,513,828 B1 * | 8/2013 | Ripley | .................... | B60L 8/006 290/50 |
| 9,649,772 B2 * | 5/2017 | Shimizu | ................ | B26B 19/146 |
| 9,776,715 B2 * | 10/2017 | Zhou | ...................... | B60K 16/00 |
| 10,309,370 B2 * | 6/2019 | Huang | .................... | F03D 3/064 |
| 2010/0181780 A1 * | 7/2010 | Gillett | ..................... | F03D 3/002 290/1 R |
| 2012/0063900 A1 * | 3/2012 | Kestermann | .......... | F03D 7/0224 416/147 |
| 2013/0328318 A1 * | 12/2013 | Ozawa | ................... | B60K 16/00 290/55 |
| 2017/0218922 A1 * | 8/2017 | Rogers | ................... | B60L 58/21 |

* cited by examiner

*Primary Examiner* — M Baye Diao
(74) *Attorney, Agent, or Firm* — Rosenberg, Klein & Lee

(57) ABSTRACT

A vehicle charging assembly includes a charging device that is located in the vehicle, in the top of the vehicle, in the chassis of the vehicle, in the hood of the vehicle, or in one of the doors of the vehicle. The outside air is introduced into the charging device and drives the blade unit and the shaft when the vehicle moves, and the air exits from the vehicle from outlets. The charging unit includes two power generating units accommodated in two respective positioning units to prevent the outside air from entering into the positioning units. The power generating units are connected to the shaft and generate electric power to be used to the vehicle or to be stored in the battery units. The power generating unit is coupled to a processing unit which controls the power generating unit to stop or to transfer electric power to the battery unit.

9 Claims, 4 Drawing Sheets ary by the present invention relates to a vehicle charging assembly by using air introducing from outside of the vehicle and

VEHICLE CHARGING ASSEMBLY BY USING WIND FORCE

BACKGROUND OF THE INVENTION

1. Fields of the Invention

The present invention relates to a vehicle charging assembly by using air introducing from outside of the vehicle and drives the blade units and the shafts to generate electric power by the power generating units. The electric power is used to drive the vehicle or to be stored in battery units.

2. Descriptions of Related Art

The sources of petroleum are gradually used out along with the highly developed modern societies which are built and generated globally. The exhaust from the combustion engines that consumes a lot of petroleum and causes disasters due to global warming effect. Therefore, a sustainable and clean energy is one of the answers to solve the global problems mentioned above.

Wind is used to drive blades which rotates shafts to transfer kinetic energy into electric power.

The electric vehicles use batteries and the batteries are charged from outside source when the battery power run out. That is to say, for the electric vehicles, the only source to drive the vehicles is the electric power from the batteries, and once the batteries cannot be charged in time, the vehicles cannot move.

The present invention intends to provide a vehicle charging assembly by using air introducing from outside of the vehicle and drives the blade units and the shafts to generate electric power which charges the batteries of the vehicles.

SUMMARY OF THE INVENTION

The present invention relates to a vehicle charging assembly and comprises a charging device which includes a blade unit, and the blade unit includes multiple blades, and a shaft is connected to the center of the blade unit. The blades are located along the outer surface of the shaft. At least one of two ends of the shaft is connected with a power generating unit.

Preferably, the power generating unit is coupled to a battery unit and a processing unit. The processing unit has a pre-set current value. The battery unit is coupled to a detecting unit to which the processing unit is coupled. The detecting unit detects current of the battery unit and compares the current of the battery unit with the pre-set current value. When the current of the battery unit reaches the pre-set current value, the processing unit demands the power generating unit to stop transferring electric power to the battery unit. When the current of the battery unit is less than the pre-set current value, the processing unit demands the power generating unit to transfer electric power to the battery unit.

Preferably, the shaft extends through the center of the blade unit.

Preferably, the blades extend radially from the blade unit.

Preferably, there are two power generating units respectively connected to the two ends of the shaft. The shaft defines two positioning units, and the two power generating units are respectively accommodated in the two positioning units. A path is formed between the blade unit and each of the two positioning units.

Preferably, the charging device is located in the interior of a vehicle.

Preferably, the charging device is located in the interior of the top of a vehicle.

Preferably, the charging device is located in the interior of the chassis of a vehicle.

Preferably, the charging device is located in the interior of the hood of a vehicle.

Preferably, the charging device is located in the interior of the door of a vehicle.

The primary object of the present invention is to provide a vehicle charging assembly and includes a charging device which can be installed in the interior space of the vehicle, in the top of the vehicle, in the chassis of the vehicle, in the hood of the vehicle, or in one of the doors of the vehicle. When the vehicle moves, the outside air is introduced into the charging device via the inlets and drives the blade unit and the shaft, and the air exits from the vehicle from outlets. The charging unit includes two power generating units accommodated in two respective positioning units to prevent the outside air from entering into the positioning units. The power generating units are connected to the shaft and generate electric power to be used to the vehicle or to be stored in the battery units. The power generating units transfer kinetic energy of flowing air into electric power. The power generating unit is coupled to a processing unit which controls the power generating unit to stop or to transfer electric power to the battery unit.

Another object of the present invention is to provide a vehicle charging assembly wherein the detecting unit detects the current of the battery unit and compares the current of the battery unit with the pre-set current value of the battery unit. When the current of the battery unit reaches the pre-set current value, the processing unit demands the power generating unit to stop transferring electric power to the battery unit. When the current of the battery unit is less than the pre-set current value, the processing unit demands the power generating unit to transfer electric power to the battery unit.

The present invention will become more apparent from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
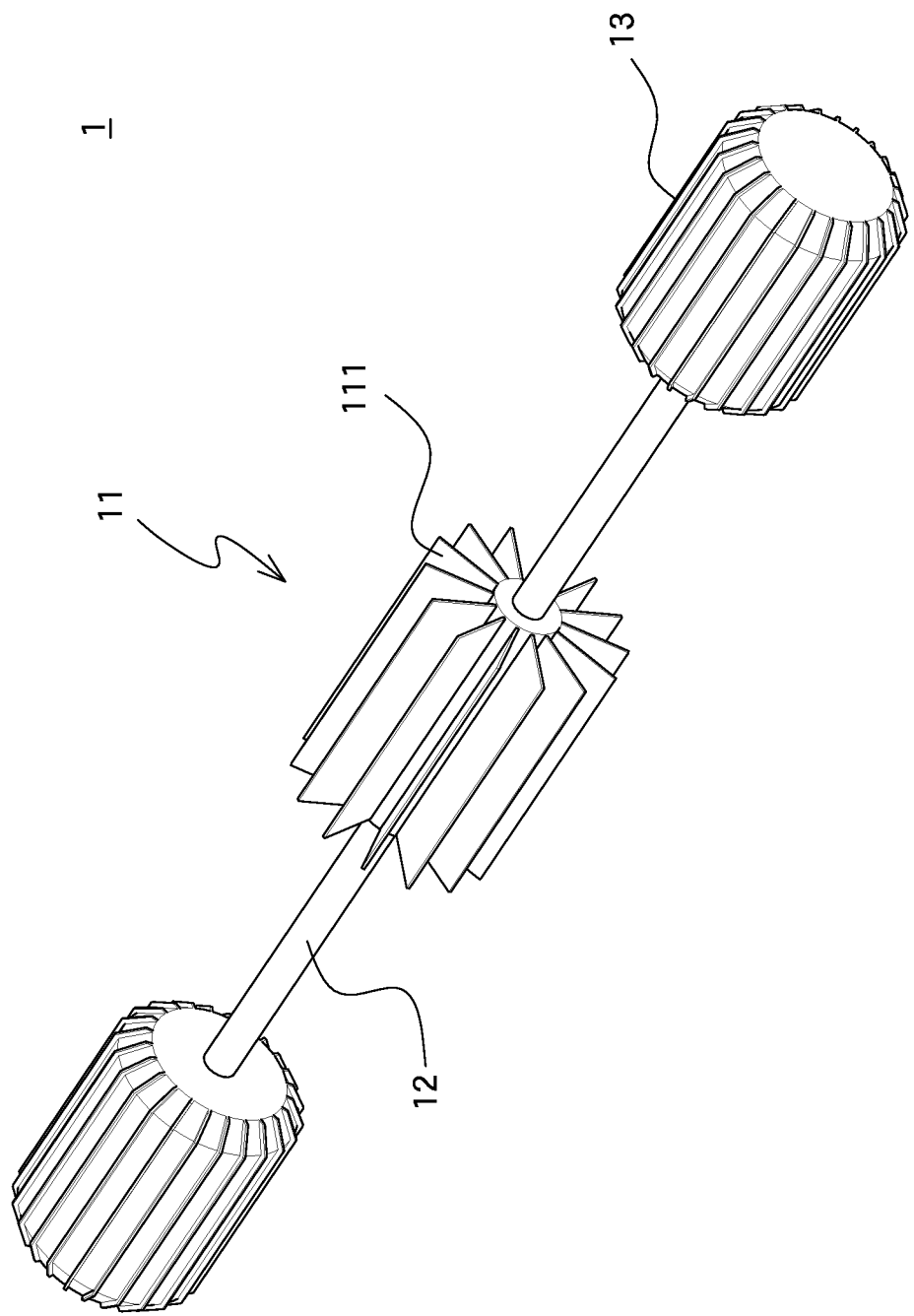
FIG. 1 is a perspective view to show the vehicle charging assembly of the present invention.
Figure 2:
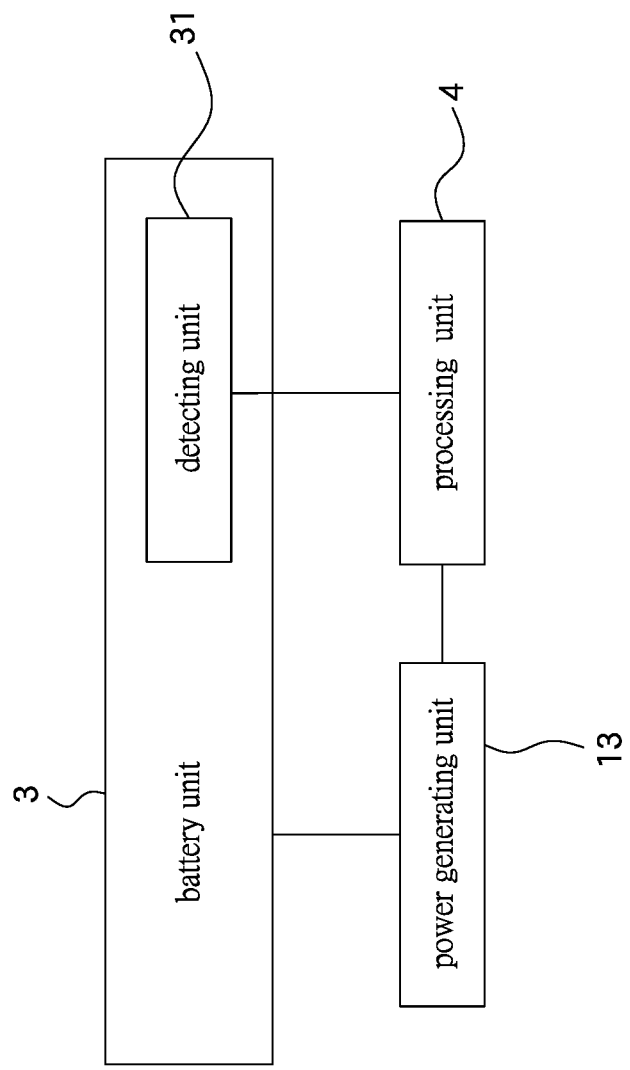
FIG. 2 shows the elements of the vehicle charging assembly of the present invention.
Figure 3:
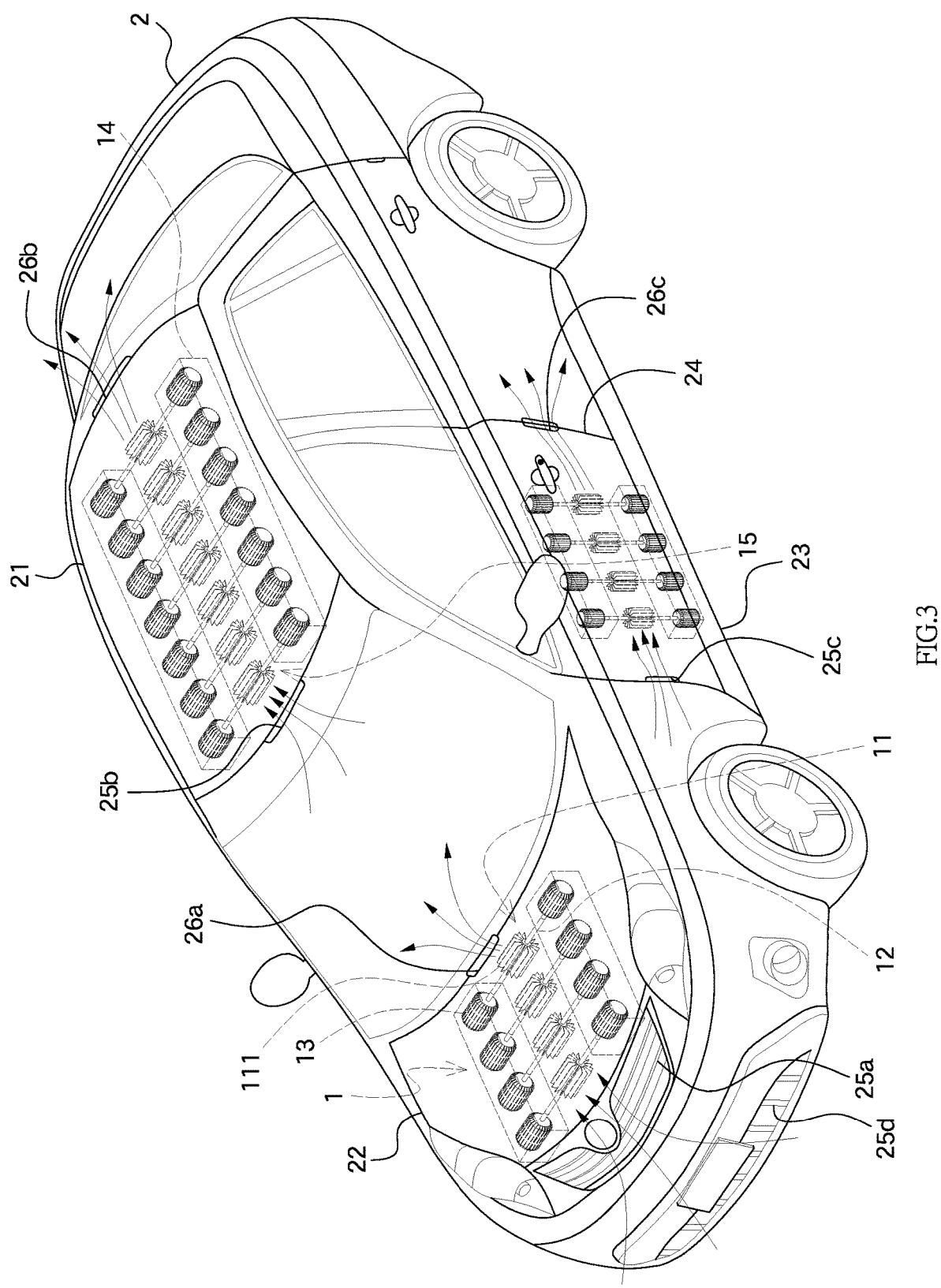
FIG. 3 shows that the vehicle charging assembly of the present invention is installed in the top, the hood and the door of a vehicle.

Referring to FIGS. 1 and 2 3, the vehicle charging assembly of the present invention comprises a charging device 1. Multiple charging devices 1 are installed is located in the interior of a vehicle 2. In one embodiment, the charging devices 1 are installed in the interior of the top 21 of the vehicle 2, in the interior of the hood 22 of the vehicle 2, in the interior of the chassis 23 of the vehicle 2, or in the interior of one of the hoods 24 of the vehicle 2. The vehicle 2 includes an inlet 25 and an outlet 26, and the inlet 25 and the outlet 26 are located corresponding to the charging devices 1.

The charging device 1 includes a blade unit 11 which includes multiple blades 111. In one embodiment, the blades 111 extend radially from the center of the blade unit 11. A shaft 12 is connected to the center of the blade unit 11. In one embodiment, the blades 111 are located along the outer surface of the shaft 12 and the shaft 12 extends through the center of the blade unit 11. At least one of two ends of the shaft 12 is connected with a power generating unit 13. In one embodiment, there are two power generating units 13 respectively connected to the two ends of the shaft 12. The shaft 12 defines two positioning units 14, and the two power generating units 13 are respectively accommodated in the two positioning units 14. A path 15 is formed between the blade unit 11 and each of the two positioning units 14. In one embodiment, the end edges of each blade 111 of the blade unit 11 is in flush with the positioning units 14.

In one embodiment, the power generating unit 13 is coupled to a battery unit 3 and a processing unit 4. The processing unit 4 has a pre-set current value. The battery unit 3 is coupled to a detecting unit 31 to which the processing unit 4 is coupled. The detecting unit 31 detects current of the battery unit 3.

Figure 4:
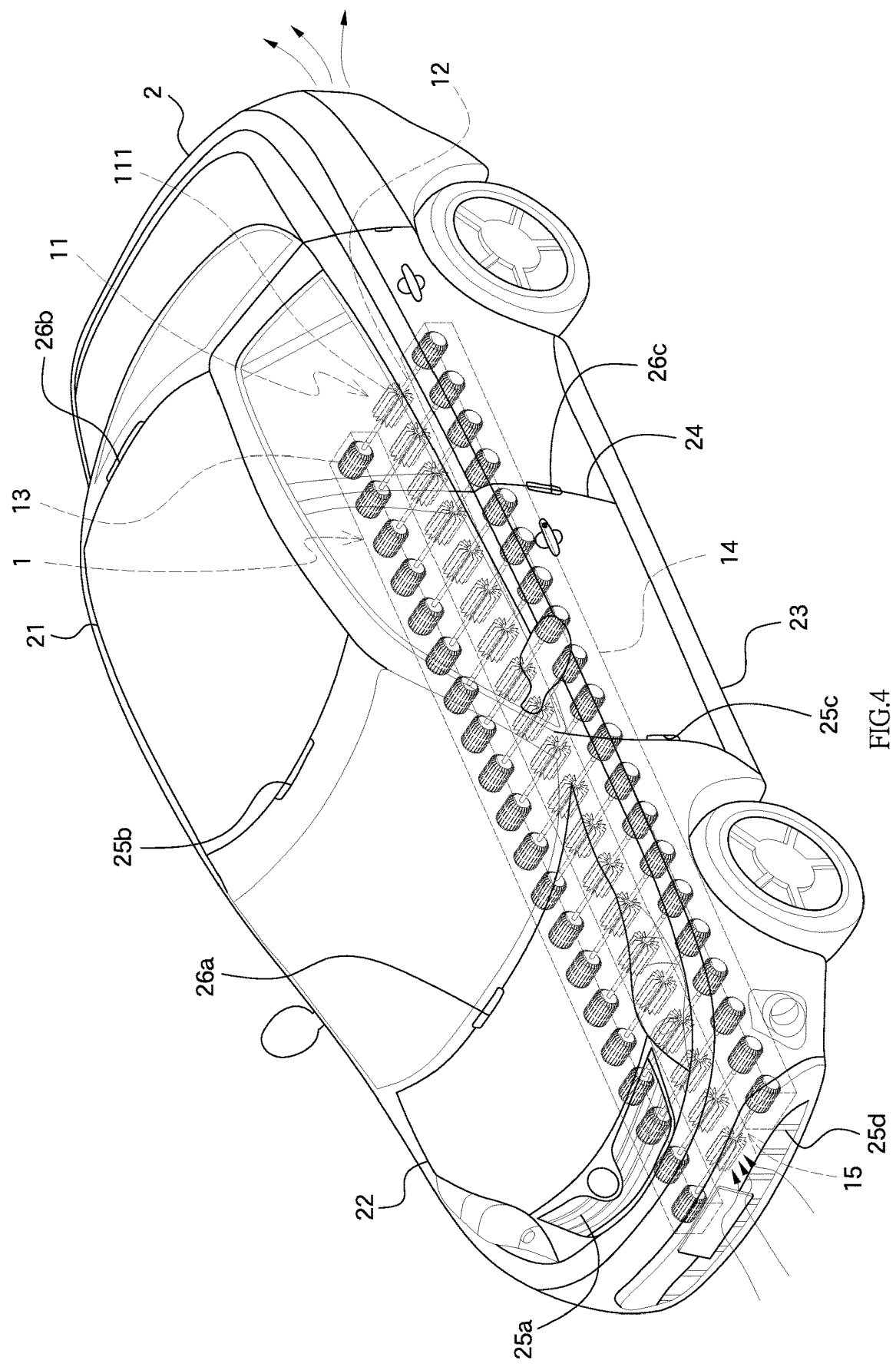
FIG. 4 shows that the vehicle charging assembly of the present invention is installed in the chassis of a vehicle.

As shown in FIGS. 2 to 4, the charging devices 1 are installed in the interior of the top 21 of the vehicle 2, in the interior of the hood 22 of the vehicle 2, in the interior of the chassis 23 of the vehicle 2, or in the interior of one of the doors 24 of the vehicle 2. When the vehicle 2 moves, the outside air is introduced to the paths 15 via the inlets 25a, 25b, 25c and 25d, and drives the blade units 11 and the shafts 12. The two power generating units 13 of each charging device 1 are accommodated in two respective positioning units 14 to prevent the outside air from entering into the positioning units 14. The air then exits from the vehicle 2 from the outlets 26a, 26b and 26c.

The power generating units 13 transfer the kinetic energy of the flowing air into electric power. The electric power is be used to the vehicle 2 or to be stored in the battery units 3.

Besides, the detecting units 31 detect the current of the battery units 3 and compares the current of the battery units 3 with the pre-set current value. When the current of the battery units 3 reaches the pre-set current value, the processing units 4 demand the power generating units 13 to stop transferring electric power to the battery units 3. When the current of the battery units 3 is less than the pre-set current value, the processing units 4 demand the power generating units 13 to transfer electric power to the battery units 3. The electric power stored in the battery units 3 can be used when needed.

While we have shown and described the embodiment in accordance with the present invention, it should be clear to those skilled in the art that further embodiments may be made without departing from the scope of the present invention.

What is claimed is:

1. A vehicle charging assembly comprising:
   at least one charging device, the charging device having a blade unit including multiple blades, the charging device including a shaft connected to a center of the blade unit, the blades being located along an outer surface of the shaft, at least one of two ends of the shaft is connected with a power generating unit, the power generating unit being coupled to a battery unit and a processing unit, the processing unit storing a pre-set current value, a detecting unit coupled to both of the processing unit and the battery unit, and the detecting unit detecting current associated with the battery unit and comparing the current associated with the battery unit to the pre-set current value; and
   wherein when the current associated with the battery unit is less than the pre-set current value, the power generating unit is controlled by the processing unit to transmit electrical power to the battery unit; and wherein when the current associated with the battery unit reaches the pre-set current value, the power generating unit is controlled by the processing unit to stop transmitting electrical power to the battery unit.

2. The vehicle charging assembly as claimed in claim 1, wherein the shaft extends through the center of the blade unit.

3. The vehicle charging assembly as claimed in claim 1, wherein the blades extend radially from the blade unit.

4. The vehicle charging assembly as claimed in claim 1, wherein there are two power generating units respectively connected to the two ends of the shaft, the shaft being coupled to two positioning units, the two power generating units are respectively accommodated in the two positioning units, and a path is formed between the blade unit and each of the two positioning units.

5. The vehicle charging assembly as claimed in claim 1, wherein the charging device is located in an interior of a vehicle.

6. The vehicle charging assembly as claimed in claim 5, wherein the charging device is located in an interior of a top of the vehicle.

7. The vehicle charging assembly as claimed in claim 5, wherein the charging device is located in an interior of a chassis of the vehicle.

8. The vehicle charging assembly as claimed in claim 5, wherein the charging device is located in an interior of a hood of the vehicle.

9. The vehicle charging assembly as claimed in claim 5, wherein the charging device is located in an interior of a door of the vehicle.

* * * * *